United States Patent [19]
Catherino

[11] 3,877,986
[45] Apr. 15, 1975

[54] RECHARGEABLE CELL HAVING IMPROVED CADMIUM NEGATIVE ELECTRODE AND METHOD OF PRODUCING SAME

[75] Inventor: Henry A. Catherino, Gainesville, Fla.

[73] Assignee: General Electric Company, Owensboro, Ky.

[22] Filed: July 25, 1972

[21] Appl. No.: 275,086

[52] U.S. Cl. .................................................. 136/24
[51] Int. Cl. .......................................... H01m 43/04
[58] Field of Search .......................... 136/24; 75/0.5

[56] References Cited
UNITED STATES PATENTS

| | | | |
|---|---|---|---|
| 2,988,585 | 6/1961 | Peters | 136/24 |
| 3,023,260 | 2/1962 | Coler et al. | 136/24 |
| 3,060,254 | 10/1962 | Urey | 136/24 |
| 3,384,513 | 5/1968 | McHenry | 136/24 |
| 3,706,601 | 12/1972 | Strier et al. | 136/24 X |

Primary Examiner—John H. Mack
Assistant Examiner—C. F. Lefevour
Attorney, Agent, or Firm—D. A. Dearing; F. L. Neuhauser

[57] ABSTRACT

A rechargeable cell is disclosed having an improved cadmium negative electrode comprising a mixture of cadmium metal powder and cadmium oxide powder mixed with a binder and applied to a foraminous substrate which is preferably a conductor. The particle shape and size of the cadmium metal, as well as the percentage of cadmium metal, is important. The cell has a higher energy density and improved anti-fading properties.

9 Claims, 2 Drawing Figures

RECHARGEABLE CELL HAVING IMPROVED CADMIUM NEGATIVE ELECTRODE AND METHOD OF PRODUCING SAME

BACKGROUND OF THE INVENTION

This invention relates to rechargeable cells, and more particularly, rechargeable cells having cadmium negative electrodes.

Cadmium electrodes for electrochemical cells have been produced in a number of ways, including application of other cadmium salts to a substrate followed by electrochemical conversion to metallic cadmium as well as by direct application of cadmium-cadmium oxide paste to a substrate. In actual practice, it has been found necessary to charge and discharge the electrode to transform these substances into usable and electrochemically reactive forms before the electrode can be used in the cell to obtain maximum charging capacity in relationship to the amount of cadmium actually present. This is known in the art as the "formation process."

Attempts have been made to produce cadmium electrodes not needing such charge and discharge cycles. For example, U.S. Pat. No. 3,009,980 - Corren recites a mixture of cadmium metal and cadmium oxide in an electrode. The cadmium metal used therein is stated to be less than 325 mesh. Most attempts to produce finely divided cadmium metal particles result in production of an easy oxidizable reaction mass which is very difficult to work with. On the other hand, larger particle sizes of cadmium metal were found to result in materials which were not reactive, that is, very little of the cadmium metal appeared to be oxidized in subsequent discharge and charging cycles.

It is also known to manufacture cadmium electrodes using, as a starting material, only cadmium oxide. In such a process, however, it is usually desirable to reduce some of the cadmium oxide to metallic cadmium before introduction of the electrode into a cell to provide excess potential or capacity in the negative electrode to counter what is commonly called "fading." While the phenomenon of fading is not completely understood, apparently, during the life of the cell, some of the active material of the negative electrode no longer is easily reduced or oxidized. By providing excess charged capacity in a negative electrode—with respect to the charge in the positive electrode—such losses can be compensated for.

To provide such precharge, however, a negative electrode comprising only cadmium oxide must be subject to a reduction or charging step before the electrode is assembled into the cell. This is because a positive electrode is conventionally constructed in an uncharged state, and therefore the negative electrode must also be assembled into the cell uncharged so that both electrodes may be subsequently charged.

It is therefore an object of this invention to provide an improved rechargeable cell including a negative cadmium electrode which is in an uncharged state yet contains the desired amount of precharge. It is another object of the invention to provide a negative cadmium electrode containing cadmium metal in an electrochemically reactive form. It is yet another object of the invention to provide a negative cadmium electrode produced using cadmium metal of a particular shape and particle size. It is yet another object of the invention to provide a negative cadmium electrode comprising a mixture of cadmium metal particles and cadmium oxide particles in an unsintered fluorocarbon binder which allows the finished electrode to be further shaped into non-planar forms. It is a further object of the invention to provide a rechargeable cell having improved energy density, anti-fading and simplicity of assembly. These and other objects of the invention will be apparent from the specification.

SUMMARY OF THE INVENTION

In accordance with the invention, a rechargeable cell having an improved cadmium negative electrode having enhanced anti-fading properties is provided comprising stabilized cadmium metal particles having an average particle size of about 3–12 microns and preferably containing at least about 1% by weight of cadmium oxide to inhibit oxidization of the metallic powder and further mixed with cadmium oxide powder and a binder. The mixture is spread or pressed on a foraminous substrate by appropriate means to form the electrode.

DESCRIPTION OF THE PREFERRED EMBODIMENT

Figure 1:
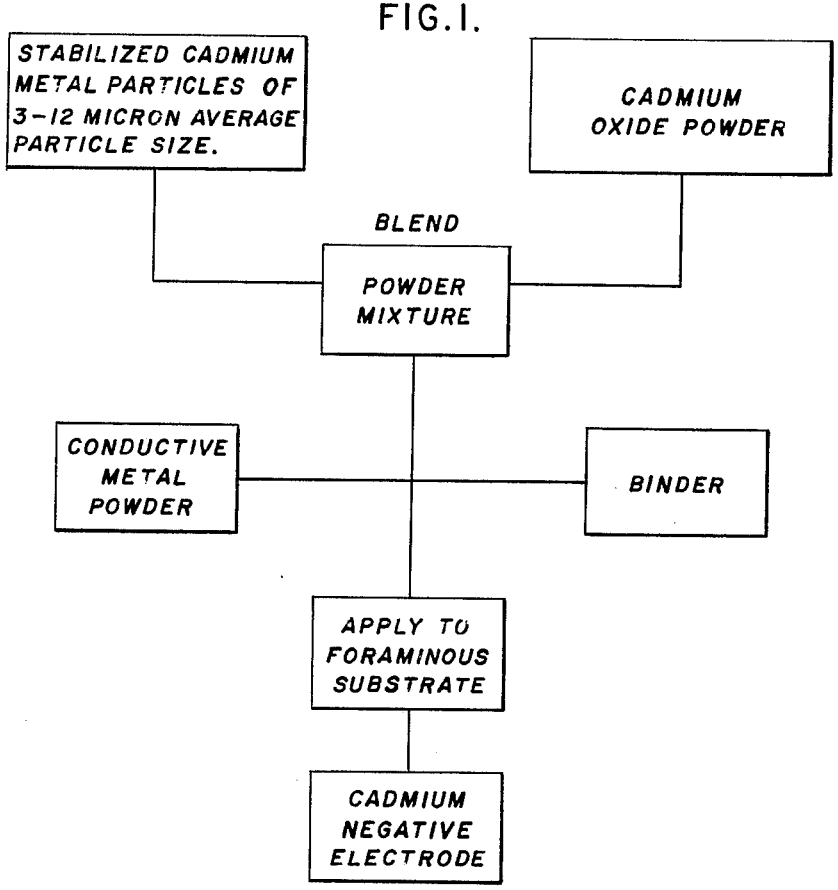
FIG. 1 is a flow sheet of the invention.

In accordance with the invention, an improved rechargeable cell is produced by constructing a negative cadmium electrode comprising a mixture of cadmium oxide and powdered cadmium metal in a form which is not readily oxidizable in air yet can be made electrochemically active and mixed together with a binder and applied to a foraminous substrate.

The active electrode material to be applied, together with the binder, to the foraminous substrate is produced by mixing together cadmium metal particles and cadmium oxide particles in a predetermined ratio of about 25–40% by weight metallic cadmium and about 60–75% by weight cadmium oxide.

The cadmium metal powder used to produce the electrode invention must be carefully prepared to an average particle size of about 3–12 microns, preferably 5–10 microns, and stablized with at least 1% cadmium oxide to prevent premature oxidization of the cadmium metal particles before subsequent mixing with the cadmium oxide particles. It is further preferred that the particles be spherically shaped as this has been found to produce, in the preferred particle size range, an electrochemically active cadmium metal particle which is not easily oxidized in air. It should be noted that cadmium metal powder, if finally divided into very small particle size, provides the requisite electrochemical reactivity yet is easily oxidized by air (pyrophoric) and therefore very difficult to work with. Larger particle sizes, while substantially eliminating the possibility of this inadvertent oxidization, greatly reduces the electrochemical reactivity of the particle. Metallic cadmium powder in the preferred particle size range, however, has been found to be sufficiently small to produce the desired electrochemical reactivity without undue risks of premature oxidization while producing the electrode particularly, as will be described below, when stabilized with a minor amount of cadmium oxide. It has been found that cadmium metal powder, in the particle size range desired in the practice of the invention, can be produced by condensing vaporized cadmium metal in the presence of a controlled amount of oxygen. This provides a mixture of metallic cadmium in the form of spherically shaped particles having an average particle size of about 3–12 microns and a minor amount of about 1–6% by weight cadmium oxide.

Cadmium metal powder formed by condensing vaporized metal has been found, by electron micrographic studies, to yield spherical particles in contrast to conventional grinding techniques resulting in irregularly shaped particles. The recited average particle size of about 3–12 microns is based on metallographic measurements and Fisher subsieve sizer measurements. The metallographic measurements indicate that the cadmium powder found useful in producing the electrode of the invention had a diameter distribution of from about 1–16 microns and a mean particle diameter of 5–6 microns with an approximate standard deviation of ±2 microns. The Fisher sub-sieve sizer measurement indicated an average particle size of 10 microns ±2 microns. It should also be understood that the use of the term "average" is meant to not exclude minor amounts of particles either smaller or larger than the recited range.

In this specification, reference is made to the shape of the particles of cadmium metal as spherical. This term is to be understood to mean that the particles largely appear as spheres under microscopic examination. Some of the particles, however, appear as spheres with a flattened side and therefore may be termed spheroidal, that is, a body that is almost, but not a perfect sphere. This is to be contrasted with irregularly surfaced particles including polyhedra produced, for example, by a mechanical abrasion method such as grinding. Photomicrographs also show the particles grouped together as conglomerates wherein smaller spheres appear to be affixed in some manner to larger spheres very analagous to a spatial arrangement of marbles, billiard balls, and basket balls in contact with each other. These conglomerates are weakly bound and slight mechanical action causes them to disintegrate into smaller conglomerates and/or individual particles. The recited particle range is therefore not intended to refer to the overall size of the conglomerate.

While it is not entirely understood why the cadmium metal powder in the particle shape and size recited yields superior results, nor why the presence of a small amount of oxygen in the condensation is necessary, it is presumed that the oxygen (1) may be reacting with the very fine cadmium metal particles, that is, particles below the desired size and particularly those of submicron size and (2) the larger particles may have their surfaces protected from further oxidation by a thin layer of cadmium oxide. Thus, the resulting powder is more stable in air during the subsequent steps of constructing an electrode.

The cadmium metal powder described above is subsequently mixed in the desired ratio with cadmium oxide powder preferably having a particle size of about 1 micron to produce, in the finished electrode, a mixture providing the desired amount of precharged, electrochemically active, cadmium metal, as well as the desired amount of chargeable capacity, that is, cadmium oxide. The amount of electrochemically reactive cadmium oxide will be the equivalent of the desired capacity of the negative electrode, that is, in principle equal to the capacity of the positive electrode with which it will be assembled in the finished cell. In practice, about 80% of the cadmium oxide used is electrochemically active. Therefore in a 1.0 ampere-hour capacity cell, normally 2.62 grams of cadmium oxide would be used in the production of the negative electrode resulting in the use of 1.35 grams of metallic cadmium powder as well to produce the required amount of electrochemically active precharge. The amount of cadmium powder used is variable and determined by the application. The minimum level is determined as the level at which no capacity loss is observed during the early charge-discharge cycles of the assembled cell. A safe level of precharge is about 33% by total weight of cadmium and cadmium oxide but may vary depending on the cell application.

It should be noted that, while the metallic cadmium powder in the particle size range used in the invention is referred to as in an electrochemically reactive form, more precisely the metallic powder has been found to be sufficiently electrochemically reactive so that subsequent cycling in the already assembled cell produces a highly reactive form. It has, however, been found that the metallic cadmium powder used in the present invention is not sufficiently electrochemically reactive to be directly useful in a primary cell. It should be emphasized again, however, that no premature cycling of the electrode of the invention is necessary before assembly into a cell.

In accordance with the invention, the powder mixture is further mixed, in a preferred embodiment, with about 1%, by total weight of the powder mixture, nickel metal powder, to provide a more uniform mixture of ingredients during the mixing process. That is, it serves to prevent the formation of hardened ball-like masses. As a variation of this composition, metal powders may be added well about a 1% level, for example 30%, for the purpose of enhancing the electrical conductivity of the finished electrode.

The resulting powder mixture is then mixed with about 1% by total weight of an appropriate binder prior to application to a substrate. Any suitable binder may be used such as, for example solid powder binders such as polyvinyl alcohol or fluorocarbon binders in which case the mixture is pressed onto the substrate. Dispersable or dissolvable binders may also be used. Examples of dissolvable binders include polystyrene, polyvinyl pyrolidone, and polymethylmethacrylde. The binder material preferably should be alkali-resistant when the electrode is to be used in an alkali electrolyte such as KOH.

In a preferred embodiment, the powder mixture is blended with de-ionized water containing an aqueous fluorocarbon dispersion which, in a readily available commercial dispersion, comprises about 50% solids in a ratio of 99 parts by weight of the total powder mixture to 2 parts of the fluorocarbon dispersion. This ratio may be adjusted slightly depending upon (1) the amount of dispersed fluorocarbon which is usually about 50% by weight of the dispersion, and (2) the desired physical properties of the resulting coagulated mass. The production of an electrode using an unsintered fluorocarbon binder is described in more detail in Rampel U.S. Pat. No. 3,630,781 issued Dec. 28, 1971, cross-reference to which is hereby made. The amount of water used should be sufficient to cover the powder. The actual amount is widely variable between a slurry and a submerged powder. The mass is coagulated by heating to about 170°F. but below the sintering temperature of the fluorocarbon binder, and kneading the mass until it coagulates. A preferred variation is to begin the process with water preheated to 170°F, before blending the powder into it.

The resulting coagulated mass is pressed, preferably by the use of rollers, into and over a foraminous substrate which is, in a preferred embodiment, a metal screen such as nickel metal screen. The screen containing the paste is again passed through a set of rollers to further compress and to reduce the total thickness of the resulting electrode to, for example in one embodiment, about 23 mils. The minimum thickness is, of course, the thickness of the screen or substrate itself. The maximum thickness of the electrode is determined both by the mechanical handling of the resultant electrode and the electrochemical requirements of the particular cell into which the electrode is to be assembled. After the paste has been applied, the edges are trimmed and the pressed plate is placed in an oven to dry for up to about 30 minutes. The temperature in the oven is about 110°F. but can be higher if the exposure time for drying is carefully controlled.

Figure 2:
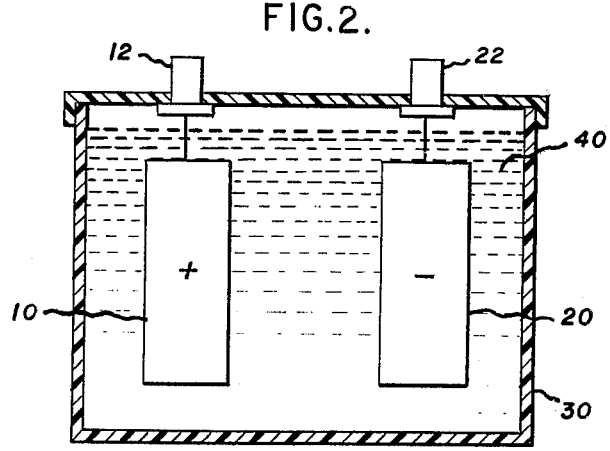
FIG. 2 is a cross section of a cell produced in accordance with the invention.

The improved negative cadmium electrode is assembled into a cell such as generally illustrated in FIG. 2 with a positive electrode having uncharged active positive material in an amount not exceeding the amount of uncharged negative material, i.e., cadmium oxide. Preferably the amount of active positive material is less than the amount of cadmium oxide. Examples of positive electrode materials which can be used with the cadmium negative electrode include nickel, mercury, and silver.

The positive and negative electrode may be pre-assembled as a flat pack or in coiled form with appropriate separators therebetween. As shown in FIG. 2, positive electrode 10 and negative electrode 20 are inserted into an alkali electrolyte resistant casing 30, the electrodes are electrically connected respectively to terminals 12 and 22 on casing 30, an electrolyte 40 such as KOH added, and the cell is sealed.

After assembly and sealing the cell is charged at a convenient rate to full capacity. The cell may then be discharged, for convenience in shipping, preferably through a low resistance resistor, for example about 1-5 ohms.

To further illustrate the invention, and by way of specific example, a cell was constructed by first mixing together the following:

33 parts by weight — spherical Cd metal particles of 5-10 micron average particle size
  65 parts by weight — CdO
  1 part by weight — Inco 255 Ni powder The powder mixture was mixed with 2 parts by weight of Teflon 30, an aqueous polytetrafluoroethylene dispersion containing about 50% solids. The slurry was heated to 170°F. to break the dispersion and coagulate the slurry into a paste. The paste was then applied to a 1.25 inch wide 20×20 nickel wire mesh to which metal tabs had been previously welded. The paste was applied and pressed to a thickness of about 23 mils. The pasted edges were trimmed smooth and the length cut to 8.1 inches. The plate was then dried in an oven for about 30 minutes at 110°F.

The resulting electrode was then wound, together with separators, with a 6.5 inches long conventional nickel electrode to form a battery coil. The coil was placed in a standard sub-C cell casing with the tabs attached to the terminals. KOH electrolyte was added, and the cell was sealed.

The sealed cell was charged at 100 milliamps for 22 hours and then discharged with a 1 amp constant current until the cell voltage reached 0.9 volts. The cell was found to have a capacity of 1.6 ampere-hours, about 30% more than conventional cells of the same size, that is, fitting into the same size casing. This increased capacity is due to the higher energy density of the negative electrode which in turn enables one to use a larger positive electrode without increasing the total volume of the cell.

The cell was further cycled for 100 cycles by charging at 100 milliamps to full charge and then discharging, as above, with a constant current of 1 amp to 0.9 volts. The capacity of the cell was monitored to determine its anti-fading characteristics. After 100 cycles, the cell was found to still retain 100% of its measured capacity.

Thus, the invention provides a cell having additional capacity and enhanced anti-fading properties due to the novel cadmium electrode therein. Furthermore, the assembly of the cell of the invention, in contrast to prior art constructions, is also greatly simplified because the negative electrode produced in accordance with the invention may be immediately assembled into the cell and sealed therein without the previous time consuming and expensive intermediate process steps of charging and discharging of the material before assembly into the cell and before sealing to render into the proper electrochemically reactive form as well as to provide the desired amount of precharge, i.e., metallic cadmium. The finished electrode contains, in addition to the electrochemically reactive cadmium oxide representing the capacity of the cell in discharged form, the desired amount of metallic cadmium in electrochemically reactive form to provide additional reserve capacity for the cell if some of the electrochemically produced cadmium should be rendered passive during the course of cell use.

What I claim as new and desire to secure by Letters Patent of the United States is:

1. An improved cadmium negative electrode comprising a mixture of cadmium oxide powder; generally spherically shaped cadmium metal particles formed by condensing cadmium metal vapors in the presence of oxygen, said particles having an average particle size of approximately 3-12 microns and stabilized with a minor amount of CdO; and a binder; and applied to a foraminous substrate to form an electrode.

2. The electrode of claim 1 wherein said cadmium oxide has a particle size of about 1 micron and comprises about 60-75% by weight of the powder mixture.

3. The electrode of claim 2 wherein said cadmium metal particles comprise about 25-40% by weight of the powder mixture.

4. The electrode of claim 3 wherein said binder comprises an unsintered fluorocarbon binder.

5. An improved cadmium negative electrode for a rechargeable cell comprising a foraminous substrate having thereon a pasted mixture of about 60-75% by weight cadmium oxide having an average particle size of about 1 micron; and about 25-40% by weight generally spherically shaped cadmium metal particles having an average particle size of about 3-12 microns and formed by condensing cadmium metal vapors in the presence of a minor amount of oxygen to stabilize the metal powder; about 1% by weight of a conductive metallic powder; and about 1% by weight of an unsintered fluorocarbon binder.

6. An improved process for producing a cadmium negative electrode for a rechargeable cell having enhanced antifading properties comprising:
   a. providing generally spherically shaped particles of stabilized cadmium metal powder formed by condensing cadmium metal vapors in the presence of oxygen, said particles having an average particle size of about 3–12 microns and containing a minor amount of CdO to inhibit oxidation of the metallic powder;
   b. mixing together said metallic cadmium powder with cadmium oxide powder and a binder to form a mixture; and
   c. applying the mixture to a foraminous substrate to form an electrode.

7. The process of claim 6 wherein said cadmium metal powder is mixed with cadmium oxide having a particle size of about 1 micron.

8. The process of claim 7 wherein said metallic cadmium powder and cadmium oxide powder are further mixed with about 1% by weight of a conductive metallic powder.

9. The process of claim 8 wherein said cadmium metal and cadmium oxide powder mixture is blended with water and an aqueous dispersion of about 50% by weight fluorocarbons in a ratio of about 2 parts by weight of said dispersion to 99 parts by weight powder mixture to form a slurry; said slurry is spread on a foraminous substrate; and said coated substrate is heated to a temperature not exceeding 200°F. to irreversibly break said dispersion without sintering said fluorocarbon.

* * * * *